United States Patent
Dudding

[19]

[11] Patent Number: 6,135,470
[45] Date of Patent: *Oct. 24, 2000

[54] TRANSVERSE STABILIZER FOR WHEEL AXLE SUSPENSION SYSTEM

[75] Inventor: Ashley T. Dudding, Plainfield, Ill.

[73] Assignee: The Boler Company, Itasca, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/088,180

[22] Filed: Jun. 1, 1998

[51] Int. Cl.$^7$ ...................................................... B60G 3/20
[52] U.S. Cl. ........................... 280/124.128; 280/124.171; 280/683
[58] Field of Search .................. 280/124.1, 124.128, 280/124.153, 124.171, 124.157, 124.158, 124.162, 124.163, 124.11, 124.152, 124.166, 124.13, 678, 683, 685, FOR 170, FOR 168

[56] References Cited

U.S. PATENT DOCUMENTS

| | | |
|---|---|---|
| 2,941,817 | 6/1960 | Benson . |
| 4,262,929 | 4/1981 | Pierce ........................................ 280/713 |
| 4,273,357 | 6/1981 | Pashkow .................................. 280/697 |
| 4,773,670 | 9/1988 | Raidel, II ................................. 280/688 |
| 4,802,690 | 2/1989 | Raidel ...................................... 280/713 |
| 5,718,445 | 2/1998 | VanDenberg ............................. 280/676 |
| 5,924,712 | 7/1999 | Pierce .................................. 280/124.13 |

*Primary Examiner*—Paul N. Dickson
*Attorney, Agent, or Firm*—Cook, Alex, McFarron, Manzo, Cummings & Mehler, Ltd.

[57] ABSTRACT

A suspension system is shown and described for use with first and second frame members positioned on first and second sides of a vehicle chassis. Both frame members have a hanger mounted thereto. The suspension system includes two upper and two lower control arms. One upper and one lower control arm are positioned on each side of the vehicle. Both arms are pivotally mounted to the hanger positioned on that side of the vehicle and are further pivotally mounted to an axle seat also positioned on that side of the vehicle. A transverse stabilizer is mounted to the underside of both lower control arms and extends across the vehicle, from one side to the other, in a direction generally transverse to that of the arms. One air spring is mounted on each side of the vehicle to the frame member and the axle seat on that side. Likewise, one shock absorber is mounted on each side of the vehicle to the frame member and to the axle seat on that side.

17 Claims, 3 Drawing Sheets

TRANSVERSE STABILIZER FOR WHEEL AXLE SUSPENSION SYSTEM

BACKGROUND OF THE INVENTION

The present invention relates to innovations and improvements in axle suspensions for trucks and trailers and in certain components of such suspensions. More particularly, the present invention relates to use of a transverse stabilizer in a so-called parallel linkage suspension of the type commonly used to suspend the body of a vehicle above its front vehicle axle. The transverse stabilizer is mounted at one of its ends to the lower control arm associated with a wheel positioned at one side of the vehicle and at its opposite end to the lower control arm associated with a wheel positioned at the opposite side of the vehicle. The transverse stablizer provides extra precision to the suspension and is preferably generally rigid, yet somewhat flexible. In this regard, the transverse stabilizer might be a leaf spring.

The present invention improves the vehicle's comfort, performance, and safety by eliminating a transverse torque rod of the type typically found in prior art suspension systems. This elimination of the torque rod reduces the total unsprung mass of the vehicle and eliminates a vibration transmission path, both of which improve its ride and handling.

Another advantage of the present invention is that it provides roll stiffness for the suspension. In particular, when the vehicle chassis rolls due to jounce action of the wheel positioned on one side of the vehicle, the transverse stabilizer is deflected somewhat, but its inherent bending and torsional stiffness reacts to provide roll stiffness for the suspension.

Yet another advantage of the present invention is that it eliminates the moment force which, during vehicle cornering, would ordinarily be imposed on the joints where the lower control arms are attached at one of their ends to their associated frame hanger and at their other end to their associated axle seat. In effect, the transverse stabilizer or leaf absorbs these forces because it transforms the lower control arms into an H-frame. By eliminating this moment force, the net force exerted on those joints is merely a side load, which is typically easier to react than a combined net force of the side load and the moment force.

In view of the foregoing, it is a principal object of the present invention to provide a novel component part of a suspension whereby the vehicle's comfort, performance, and safety are enhanced.

It is a further object of the present invention to provide a novel component part of a parallel linkage suspension system which enhances the vehicle's comfort, performance, and safety.

It is yet another object of the present invention to reduce the unsprung mass of a vehicle.

It is still another object of the present invention to provide a novel component part of a parallel linkage suspension which enables the suspension system to comprise a lighter-weight suspension.

It is a further object of the present invention to provide a novel component part of a parallel linkage suspension which eliminates the need for a laterally extending torque rod.

It is an even further object of the present invention to provide a novel component part of a parallel linkage suspension that provides roll stiffness for the suspension.

It is yet another object of the present invention to provide a novel component part of a parallel linkage suspension that eliminates the moment force on the joint where the lower control arms of the suspension are pivotally mounted to their associated frame hanger and on the joint where the lower control arms are pivotally mounted to their associated axle seats.

It is still another object of the present invention to transform the lower control arms located on opposite sides of the vehicle into a generally rigid H-frame member.

It is finally another object of the present invention to provide a novel component part of a parallel linkage suspension which at one of its ends is mounted to the lower control arm associated with a wheel positioned on one side of the vehicle and at its other end is mounted to the lower control arm associated with another wheel positioned on the opposite side of the vehicle.

These and other objects of the invention will be apparent to those skilled in the art from the following detailed description of the preferred embodiment taken in conjunction with the accompanying drawings wherein:

DETAILED DESCRIPTION OF THE PREFERRED EMBODIMENT

Figure 1:
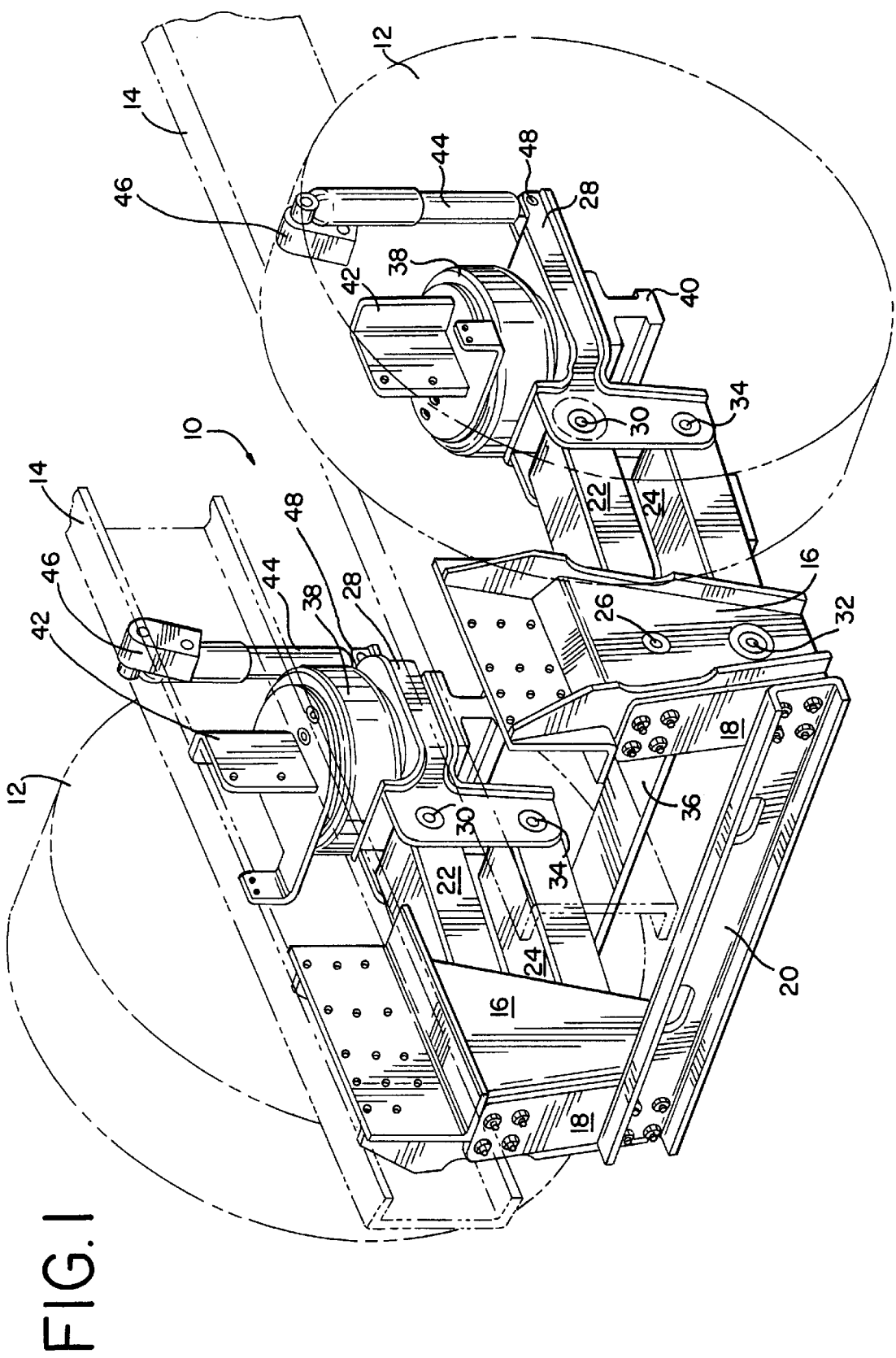
FIG. 1 is an isometric view of a suspension system for a vehicle such as a truck wherein the suspension system includes the transverse stabilizer of the present invention.

Referring to the drawings, and in particular to FIG. 1, a suspension system is shown therein and is generally designated by reference numeral 10. It will be seen and understood that the construction of this suspension system on one side is duplicated on the opposite side of the vehicle.

In accordance with conventional practice, suspension system 10 connects the wheels 12—12 of the vehicle to the chassis frame members 14—14 located at opposite sides of the vehicle. Suspension system 10 cushions the vehicle body from the forces otherwise exerted thereon while driving on uneven road surfaces. Suspension system 10 also suspends the vehicle body above the ground and maintains the body at a relatively constant height to enhance the comfort, performance, and safety of the vehicle.

Two frame hangers 16—16 are mounted on their respective fore-and-aft extending chassis frame members 14—14. Mounting pads 18—18 are mounted to each frame hanger 16 to permit a cross member 20 to be mounted at one of its ends to mount pad 18 mounted to the hanger 16 on one side of the vehicle and at its other end to mount pad 18 mounted to hanger 16 on the other side of the vehicle.

Suspension system 10 includes upper control arms 22—22 and lower control arms 24—24. Each upper control arm 22 is pivotally connected to its associated hanger 16 at a pivot bolt 26. Further, each upper control arm 22 is pivotally connected to its associated axle seat 28 at a pivot bolt 30. In a similar manner, each lower control arm 24 is pivotally connected to hanger 16 at pivot bolt 32 and to axle seat 28 at pivot bolt 34. Wear pads (not shown) may be included at each pivot bolt 26, 30, 32, 34 and the pivot bolts may include flexible bushings.

Those skilled in the art will appreciate that control arms 22, 24 control the direction of their associated wheels 12 as the wheels move over uneven road surfaces and around corners. On each side, the length and pivotal range of the control arms 22, 24 determine how much its associated wheel 12 can move and its range of angular motion.

Suspension system 10 further includes a novel component hereinafter referred to as a transverse stabilizer 36. Transverse stabilizer 36 is preferably, although not necessarily, mounted at one end to the underside surface of the lower control arm 24 on one side of the vehicle and at its other end to the underside surface of the lower control arm 24 at the opposite side of the vehicle. As such, transverse stabilizer 36 extends in a direction generally transverse to that of the generally fore-and-aft extending control arms 22, 24. In its preferred form, transverse stabilizer 36 is a leaf spring that assumes a generally planar configuration. However, those skilled in the art will appreciate that transverse stabilizer 36 may have a variety of different compositions and configurations, depending upon the desired design characteristics of suspension system 10.

Suspension system 10 further includes two air springs 38—38, each of which is mounted over one end of the vehicle axle 40 (normally the front axle) on that side of the vehicle. Upper air spring support brackets 42—42 are mounted to each chassis frame member 14—14 at a location above an end of vehicle axle 40. The top portion of each air spring 38 is attached to its associated air spring support bracket 42. The underside of each air spring 38 is mounted on its associated axle seat 28 which, in turn, is attached to axle 40. In the case of a so-called nonindependent wheel suspension, axle 40 extends from one side of the vehicle to the other side and connects the wheel 12 positioned on one side of the vehicle with the wheel 12 positioned on the other side of the vehicle.

Suspension system 10 further includes a shock absorber 44 to dampen the natural vibrations in the springs of the suspension system. Shock absorber 44 is pivotally connected at its upper end to a bracket 46 mounted on chassis frame member 14 and is attached at its bottom end to axle seat 28 by a fastener 48.

Figure 2:
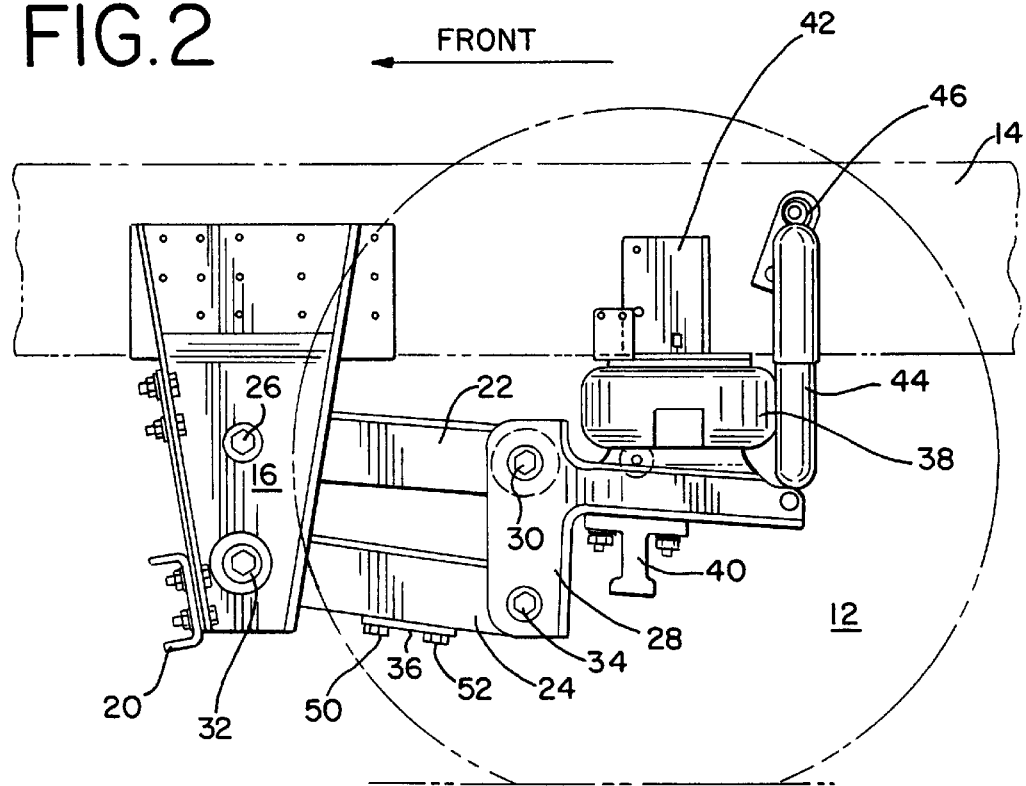
FIG. 2 is a side elevational view taken from the outside on one side of the suspension system of FIG. 1 showing one end of the transverse stabilizer of the present invention.

FIG. 2 shows suspension system 10 and all of its associated components on one side of the vehicle. As shown in FIG. 2, transverse stabilizer 36 is preferably mounted to the underside of the lower control arm 24 on each side of the vehicle. In particular, fasteners 50, 52 may be used to mount transverse stabilizer 36 to lower control arm 24.

Figure 3:
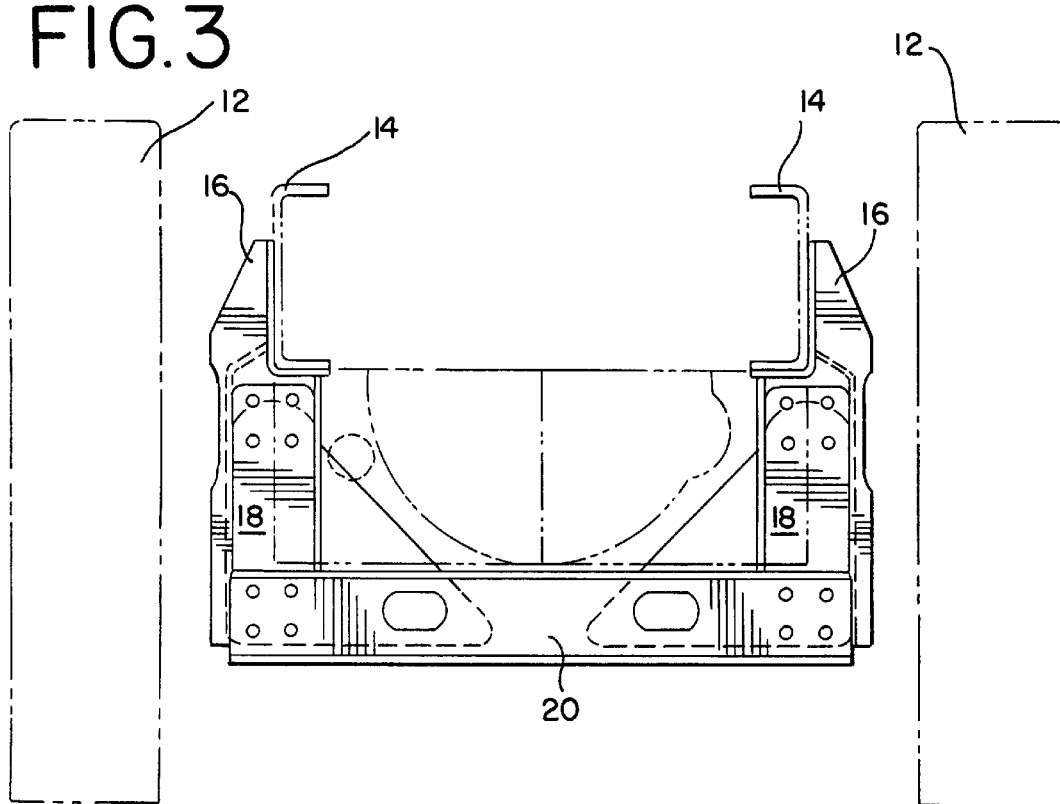
FIG. 3 is an end view of the suspension system of FIG. 1.

FIG. 3 is an end view of suspension system 10 showing the rigid cross member 20 of the vehicle frame and the manner in which it is mounted to hangers 16—16 on opposite sides of the vehicle.

Figure 4:
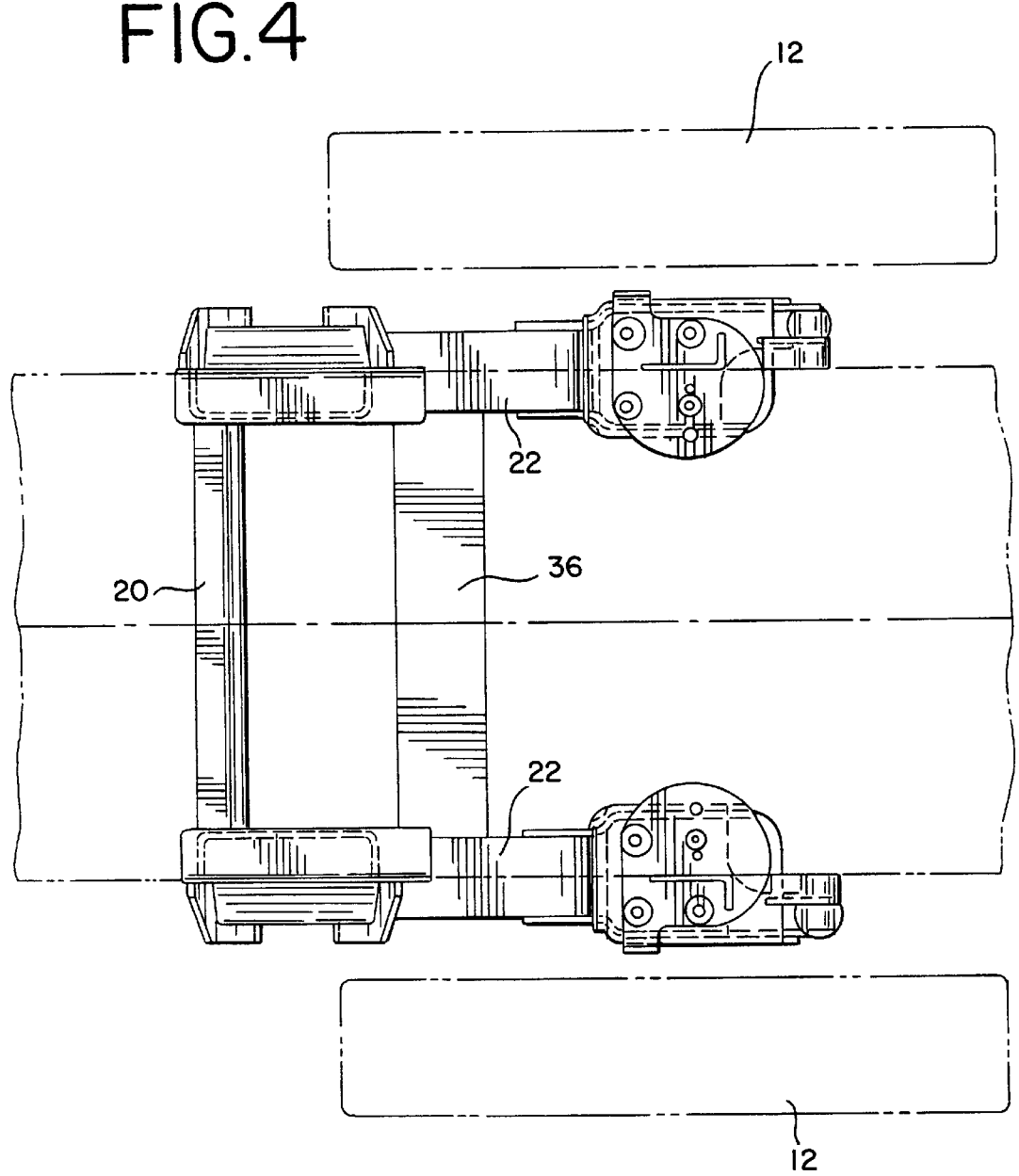
FIG. 4 is a top plan view of the suspension system of FIG. 1 showing the transverse stabilizer of the present invention extending from one side of the vehicle to the other side of the vehicle.

FIG. 4 shows transverse stabilizer 36 as viewed from above and the manner in which it extends from one side of the vehicle to the other side of the vehicle. Those skilled in the art will appreciate that transverse stabilizer 36 transforms the lower control arms into a generally stable and rigid H-frame member to achieve the objects and advantages referenced above.

Although the present invention has been described by reference to a certain preferred embodiment, it should be understood that this preferred embodiment is merely illustrative of the principles of the present invention. Therefore, modifications and/or changes may be made by those skilled in the art without departing from the true spirit and scope of the invention as defined by the appended claims.

I claim:

1. A suspension system for supporting first and second frame members on first and second sides of a vehicle chassis, said first frame member being positioned adjacent to a first end of an axle and said second frame member being positioned adjacent to a second end of said axle, said first frame member having a first hanger mounted thereto and said second frame member having a second hanger mounted thereto, a cross member mounted to said first frame hanger and to said second frame hanger, said suspension system comprising:

a first fore-and-aft extending control arm mountable to said first hanger;

a second fore-and-aft extending control arm mountable to said first hanger;

a third fore-and-aft extending control arm mountable to said second hanger;

a fourth fore-and-aft extending control arm mountable to said second hanger; and a stabilizer mounted to one of said first and second control arms and to one of said third and fourth control arms to form an H-frame member out of said one of said first and second control arms, said one of said third and fourth control arms and said stabilizer.

2. The suspension system as defined by claim 1 wherein said first control arm lies above and extends generally parallel to said second control arm and said third control arm lies above and extends generally parallel to said fourth control arm.

3. The suspension system as defined by claim 2 wherein said stabilizer is mounted to said second control arm and said fourth control arm, and said stabilizer extends in a direction generally transverse to a direction of said second and fourth control arms.

4. The suspension system as defined by claim 1 further comprising a first axle seat, said first and second control arms being mounted to said first axle seat, and a second axle seat, said third and fourth control arms being mounted to said second axle seat.

5. The suspension system as defined by claim 4 wherein said first control arm is pivotally mountable to said first hanger and to said first axle seat, said second control arm is pivotally mountable to said first hanger and to said first axle seat, said third control arm is pivotally mountable to said second hanger and to said second axle seat, and said fourth control arm is pivotally mountable to said second hanger and to said second axle seat.

6. The suspension system of claim 5 wherein said stabilizer is mounted to said second control arm and to said fourth control arm.

7. The suspension system as defined by claim 6 further comprising first and second air springs, said first air spring being mountable to said first frame member and to said first axle seat, and said second air spring being mountable to said second frame member and said second axle seat.

8. The suspension system as defined by claim 7 further comprising first and second shock absorbers, said first shock absorber being mountable to said first frame member and to said first axle seat, and said second shock absorber being mountable to said second frame member and to said second axle seat.

9. The suspension system as defined by claim 1 wherein said stabilizer is a leaf spring.

10. A suspension system for supporting first and second frame members on first and second sides of a vehicle chassis, said first frame member being positioned adjacent to a first end of an axle and said second frame member being positioned adjacent to a second end of said axle, said first frame member having a first hanger mounted thereto and said second frame member having a second hanger mounted thereto, a cross member mounted to said first hanger and to said second hanger, said suspension system comprising:

- a first fore-and-aft extending upper control arm pivotally mountable to said first hanger;
- a second fore-and-aft extending upper control arm pivotally mountable to said second hanger;
- a first fore-and-aft extending lower control arm pivotally mountable to said first hanger;
- a second fore-and-aft extending lower control arm pivotally mountable to said second hanger; and
- a stabilizer mounted to said first lower control arm and to said second lower control arm to form an H-frame member out of said first lower control arm, said second lower control arm and said stabilizer.

11. A suspension system as defined by claim 10 wherein said first upper control arm lies above and extends generally parallel to said first lower control arm and said second upper control arm lies above and extends generally parallel to said second lower control arm.

12. A suspension system as defined by claim 10 further comprising a first axle seat, said first upper and lower control arms being pivotally mounted to said first axle seat, and a second axle seat, said second upper and lower control arms being pivotally mounted to said second axle seat.

13. A suspension system as defined by claim 12 further comprising first and second air springs, said first air spring being mountable to said first frame member and to said first axle seat, and said second air spring being mountable to said second frame member and to said second axle seat.

14. The suspension system as defined by claim 13 further comprising first and second shock absorbers, said first shock absorber being mountable to said first frame member and to said first axle seat, and said second shock absorber being mountable to said second frame member and to said second axle seat.

15. The suspension system as defined by claim 10 wherein said stabilizer is a leaf spring.

16. In combination, a vehicle frame and a suspension system supporting first and second frame members on first and second sides of a vehicle chassis, said first frame member being positioned adjacent to a first end of an axle and said second frame member being positioned adjacent to a second end of said axle, said first frame member having a first hanger mounted thereto and said second frame member having a second hanger mounted thereto, a cross member mounted to said first frame hanger and to said second frame hanger, said combination comprising:

- a first fore-and-aft extending upper control arm pivotally mounted to said first hanger;
- a second fore-and-aft extending upper control arm pivotally mounted to said second hanger;
- a first fore-and-aft extending lower control arm pivotally mounted to said first hanger and positioned below said first upper control arm;
- a second fore-and-aft extending lower control arm pivotally mounted to said second hanger and positioned below said second upper control arm;
- said first upper control arm extending generally parallel to said first lower control arm and said second upper control arm extending generally parallel to said second lower control arm;
- a transverse stabilizer mounted to an underside of said first lower control arm and to an underside of said second lower control arm to form an H-frame member out of said first lower control arm, said second lower control arm and said stabilizer;
- a first axle seat, said first upper and lower control arms being pivotally mounted to said first axle seat;
- a second axle seat, said second upper and lower control arms being pivotally mounted to said second axle seat;
- a first air spring mounted to said first frame member and to said first axle seat;
- a second air spring mounted to said second frame member and to said second axle seat;
- a first shock absorber mounted to said first frame member and to said first axle seat; and
- a second shock absorber mounted to said second frame member and to said second axle seat.

17. The suspension system as defined by claim 16 wherein said stabilizer is a leaf spring.

* * * * *